May 25, 1965     P. B. MASON ETAL     3,185,066
PHOTOGRAPHIC DOCUMENT COPYING APPARATUS
Filed Sept. 28, 1962     7 Sheets-Sheet 1

INVENTORS
Paul B. Mason
BY Arthur J. Sable
Brown and Mikulka
ATTORNEYS

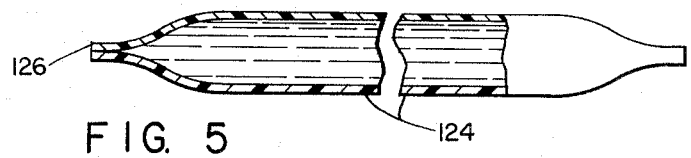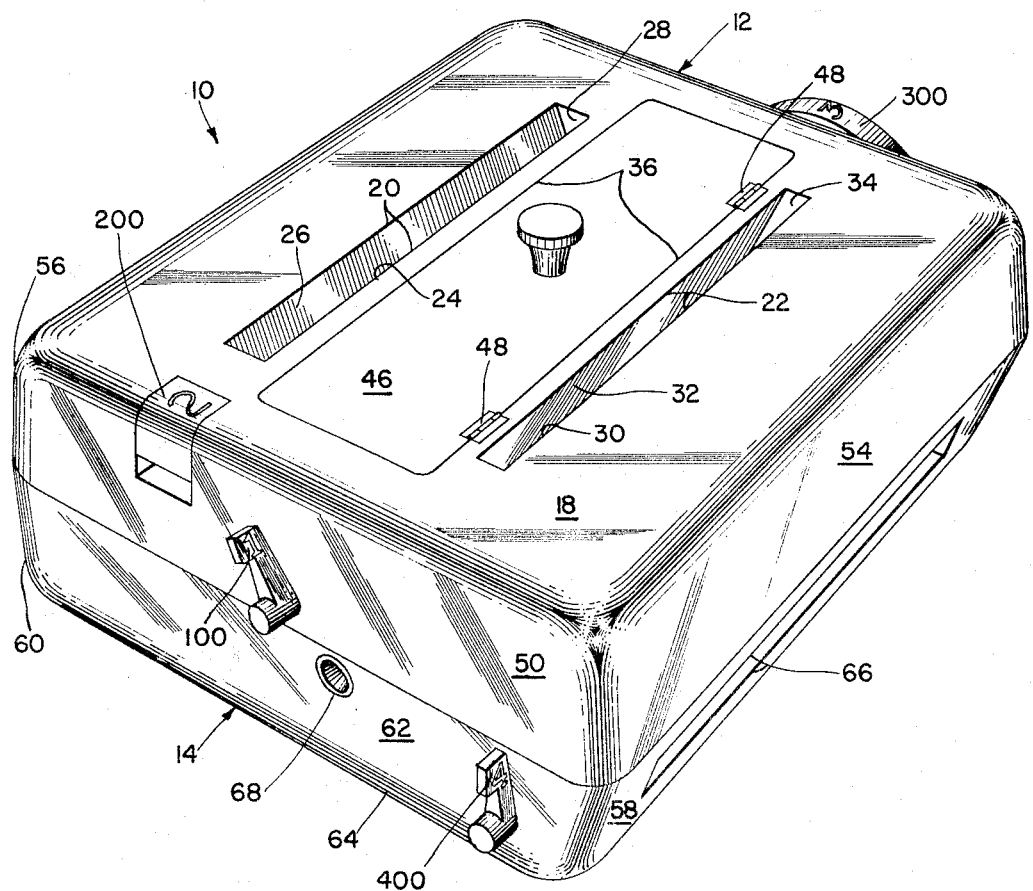

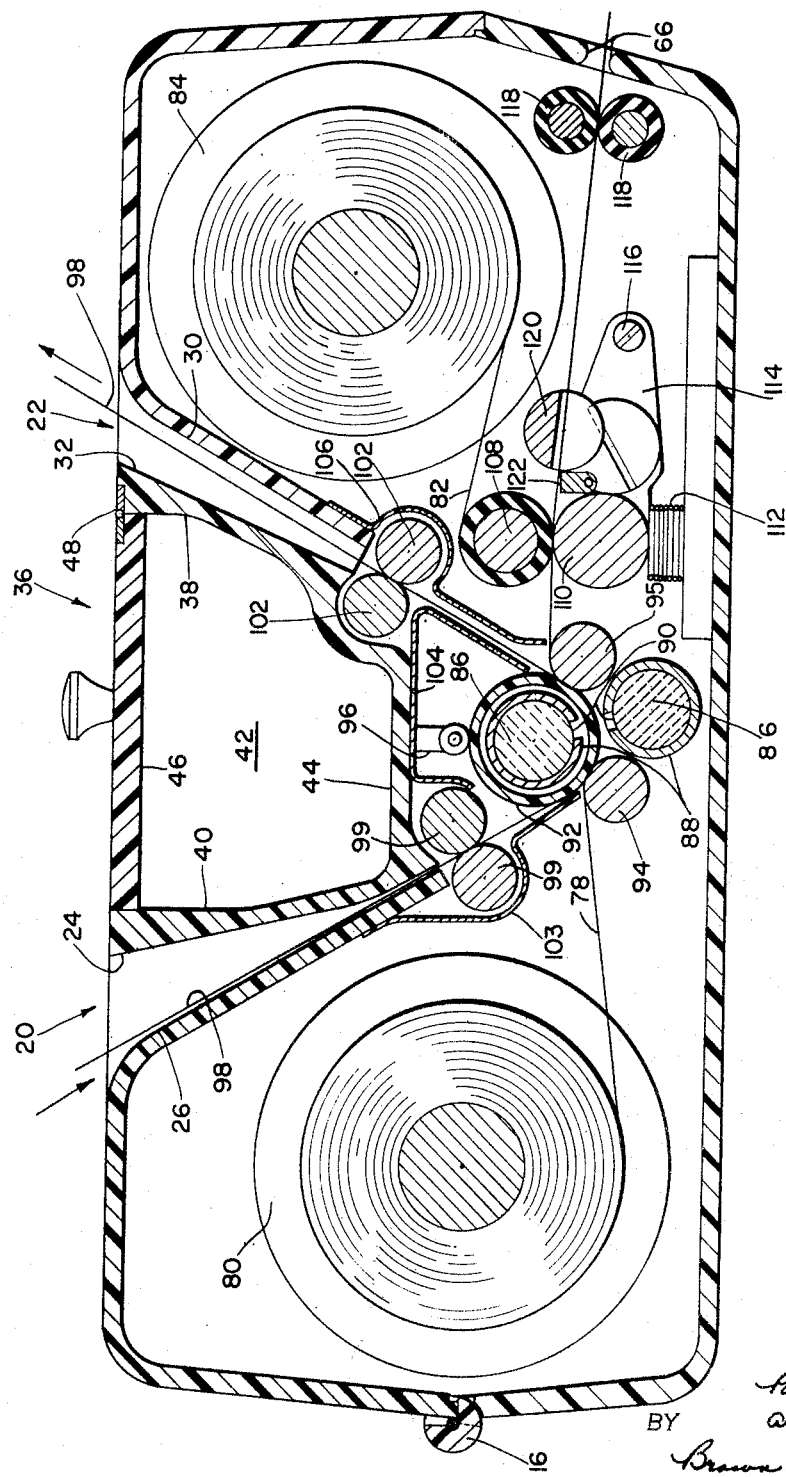

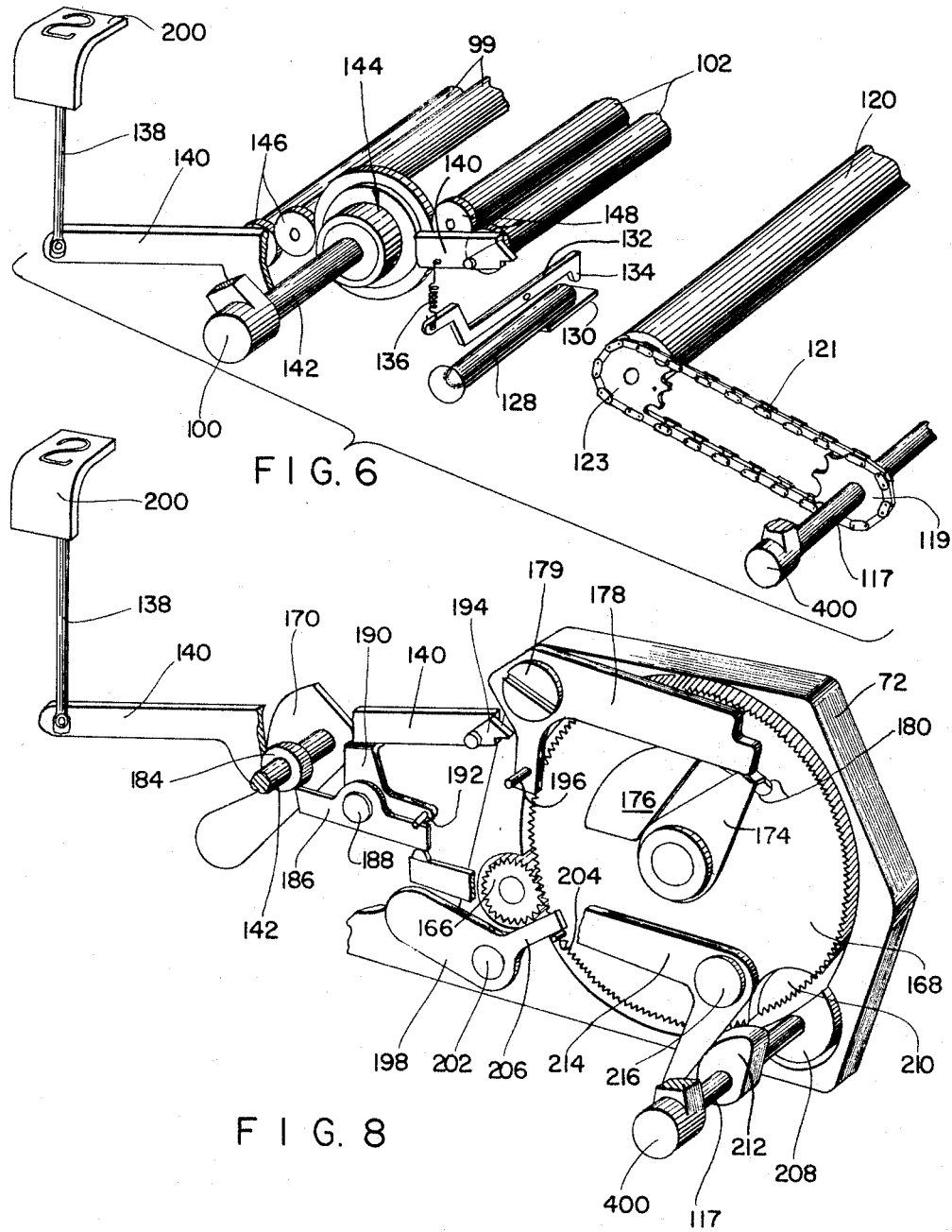

United States Patent Office

3,185,066
Patented May 25, 1965

1

3,185,066
PHOTOGRAPHIC DOCUMENT COPYING
APPARATUS
Paul B. Mason, Magnolia, and Arthur J. Sable, Boston,
Mass., assignors to Polaroid Corporation, Cambridge,
Mass., a corporation of Delaware
Filed Sept. 28, 1962, Ser. No. 226,999
7 Claims. (Cl. 95—75)

This invention relates to photography and, more particularly, to photographic apparatus for making copies of original documents.

A complete photographic document copying apparatus generally comprises means for exposing a photosensitive image-recording material in conjunction with an original document to produce an image of the original therein, and means for treating the exposed material, possibly in conjunction with another material, to produce a copy of the original document. In document copying apparatus of the type with which the present invention is concerned, the photosensitive material is in the form of a sheet comprising a layer of a photosensitive heavy metal salt, such as silver halide, on a suitable support. An area of the photosensitive sheet is exposed in conjunction with the original document and a latent image formed therein. The exposed portion of the photosensitive sheet is then superposed on a second or image-receiving sheet and a viscous processing fluid distributed between the superposed sheets. Through this process, known as a "dry" process because the processing fluid is at all times confined between the two sheets, a positive image or copy of the original document is formed on the second sheet. Additional features common to most document copying devices of this type include means for feeding an original document into the apparatus and superposing it with the photosensitive sheet during exposure thereof, exposing the photosensitive sheet by either direct or reflex exposure, separating the original from the photosensitive sheet, superposing the photosensitive sheet on the second sheet, introducing and distributing the processing fluid between the two sheets, advancing the superposed sheets through the apparatus, and severing the exposed and processed portions of the photosensitive and image-receiving sheets from the unprocessed portions thereof.

The document copier embodying the present invention is designed as a completely portable, hand-operated device requiring the use of no external power source. The operation of the device is quite simple, requiring only that the operator set the device for reflex or direct exposure, manually introduce the original document to be copied into the apparatus, introduce and then withdraw a straw-shaped container of processing fluid, actuate a series of sequentially numbered operating buttons and levers, and finally withdraw the original document and the superposed photosensitive and image-receiving sheets from the apparatus. The superposed sheets may then be separated, the photosensitive sheet being discarded and the image-receiving sheet, which comprises a copy of the original document, retained.

An object of the present invention is to provide a novel hand-operated photographic document copying device, requiring no external power source, in which the sequence of operations performed to produce a copy of an original document is positively controlled by a system of mechanical interlocks.

Another object is to provide an apparatus of the type previously mentioned with which even an untrained operator can continuously produce uniformly good copies of original documents.

Other objects of the invention will in part be obvious and will in part appear hereinafter.

2

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in conjunction with the accompanying drawings wherein:

FIGURES 1 and 2 are perspective views of document copying apparatus embodying the invention;

FIG. 4 is a sectional view of the apparatus of FIGS. 1 and 2, the section being taken subsantially midway between the sides of the apparatus;

FIG. 5 is a fragmentary view, partially in section, of a fluid container used for introducing processing fluid into the apparatus;

FIGS. 6 and 7 are fragmentary views, partially in section, showing components of the apparatus;

FIG. 8 is a perspective fragmentary view, partially in section, of a portion of the interlock mechanism used to control the sequence of operations in the apparatus of FIGS. 1 through 4.

Figure 1:
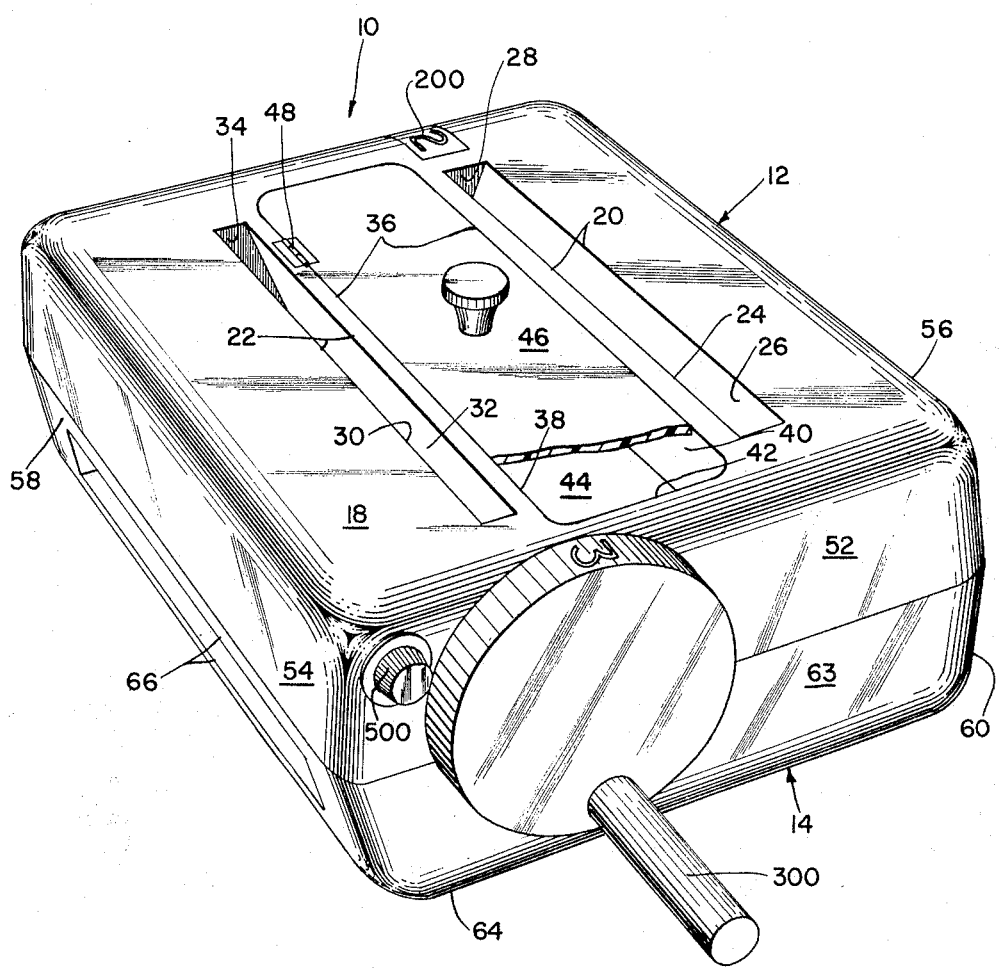
Figure 3:
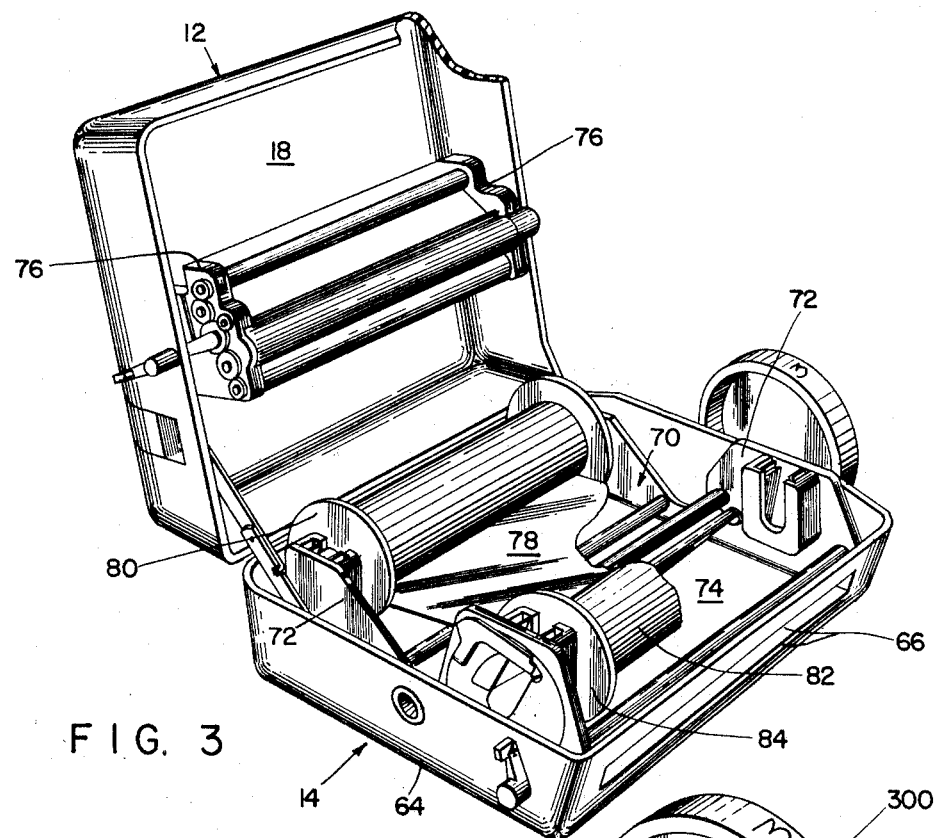
FIG. 3 is a perspective view of components of the apparatus of FIGS. 1 and 2, partially cut-away, shown with the housing of the apparatus open in an inoperative position and with the rolls of sheet material loaded in the apparatus.

Reference is now made to FIGS. 1 through 4 wherein is illustrated one form of photographic document copying apparatus embodying the invention. Housing 10, mounting and enclosing the operative components, comprises an upper housing section 12 pivotably secured to a lower housing section 14 by a hinge 16, said hinge being located at one end, called the rear end, of the apparatus. The two sections are pivotable between the closed or operative position, shown in FIGS. 1 and 2, and the open or inoperative position, shown in FIG. 3, in which the housing sections are separated to permit loading of the photographic sheet material into the apparatus.

Upper housing section 12 comprises an upper wall 18 in which are located an inlet passage 20 and an exit passage 22 through which the original documents to be copied are introduced into and fed from the apparatus. Inlet passage 20 is defined by convergent walls which may be designated forward wall 24, rear wall 26 and side walls 28. Exit passage 22 is similarly defined by forward wall 30, rear wall 32 and side walls 34. A compartment 36, in which the straw-shaped containers containing the processing fluid may be stored prior to use, is located between passages 20 and 22. The interior of the compartment is defined by forward wall 38 and rear wall 40, the opposite sides of which serve to define a portion of walls 32 and 24 of the exit and inlet passages respectively, by side walls 42 and by bottom 44. The cover 46 of the compartment is pivotably connected to upper wall 18 through hinges 48. Housing section 12 also comprises side walls 50 and 52, designated left and right side walls respectively, a forward wall 54 and a rear wall 56 to which the upper portion of hinge 16 is connected.

Lower housing section 14 comprises a forward wall 58, portions of which serve to define a withdrawal opening 66 through which the superposed photosensitive and image-receiving sheets are withdrawn from the apparatus after processing, and a left side wall 62 wherein is located tapered opening 68 through which the straw-shaped containers containing the processing fluid are introduced into and removed from the apparatus. Lower housing section 14 also comprises bottom wall 64, right side wall 63 and rear wall 60 to which the lower portion of hinge 16 in connected.

The operative components of the document copying apparatus are mounted on support members or chassis carried within housing 10 on the upper and lower housing sections. These support members include a lower chassis 70 comprising a base plate 74, which rests on bottom wall 64 of housing section 14, and side plates 72 extending upwardly from the base plate. The upper chassis comprises side plates 76 extending donwwardly from upper wall 18 of housing section 12. Side plates 76 are securely mounted to both upper wall 18 and also to side walls 42 of compartment 36.

Lower chassis 70 includes means for mounting the photosensitive and image-receiving sheets used in the apparatus. The photosensitive sheet 78, preferably in the form of an elongated strip, is supplied on a conventional spool 80, said spool being mounted at its ends for rotation between side plates 72 near the rear end of housing 10. The image-receiving sheet 82, also in the form of an elongated strip, is supplied on a similar spool 84, mounted for rotation between the side plates 72 near the forward end of the apparatus.

The means for exposing the photosensitive sheet comprise two sources of illumination and the necessary means for conducting the photosensitive sheet and original document in superposition past the illumination sources. Each source comprises a transparent cylindrical bar 86, at least equal in length to the width of the photosensitive sheet and provided with a polished surface throughout. Each bar 86 is enclosed in an opaque cylindrical tube 88, each tube being provided with an axial slot 90 equal in length to the width of the photosensitive sheet for transmitting the actinic light emitted from bar 86 to the photosensitive sheet. The light source for each bar comprises a small incandescent lamp mounted within the end section of tube 88 adjacent to the end of bar 86 within the tube. One illumination source is mounted on upper housing section 12, the other on lower housing section 14. If the superposed photosensitive sheet and original document are guided between the two sources, the photosensitive sheet may, by utilizing one source or the other, be subjected to either a direct exposure, wherein the photosensitive sheet is exposed to light transmitted to it through the original document, or to a reflex exposure wherein the actinic light is transmitted through the photosensitive sheet to the surface of the original document and is then partially reflected back to the photosensitive sheet to form a developable image therein.

The means for guiding the photosensitive sheet and original document between the two illumination sources include a transparent cylindrical tube 92 which surrounds the upper illuminating source and is mounted on upper housing section 12 coaxially with bar 86 and tube 88. A pair of elongated guide rolls 94 and 95, mounted for rotation between side plates 72 with their axes parallel to tube 92, are so located as to engage tube 92 at positions spaced from one another around the periphery of the cylindrical surface of tube 92. A backing roll 96, mounted for rotation between side plates 76 parallel to tube 92, is positioned for urging tube 92 against guide rolls 94 and 95.

Photosensitive sheet 78 is conducted from spool 80, between guide roll 94 and tube 92, around a portion of the cylindrical surface of tube 92 and between the tube and guide roll 95. The axial slots 90 in tubes 88 are positioned so that the actinic light transmitted from either of bars 86 will expose the portion of the photosensitive sheet 78 that is supported by cylindrical tube 92 between guide rolls 94 and 95.

During exposure of photosensitive sheet 78, an original document, designated 98 in FIG. 4, is superposed with the photosensitive sheet between the latter and tube 92.

The original document is introduced into the apparatus through inlet passage 20 and guided into superposition with photosensitive sheet 78 at the bite of guide roll 94 and tube 92. The means for guiding the original document and for sealing the inlet passage against light comprises a pair of substantially parallel cylindrical inlet rolls 99 mounted for rotation in juxtaposition between side plates 76. The inlet rolls engage the original document along a line lying in a plane substantially tangent to the surface of tube 92 at a line closely adjacent the line of contact of roll 94 and tube 92 and, in conjunction with light-sealing element 103 which extends downwardly from rear wall 26 to a point closely adjacent the intersection of roll 94 and tube 92, advance and guide the original into the bite of roll 94 and tube 92 at which point the original document enters into superposition with the photosensitive sheet.

The means for separating original document 98 from the photosensitive sheet following exposure of the latter in superposition with the original and for guiding the original document out of the apparatus comprise a pair of parallel outlet feed rolls 102 mounted in juxta-position for rotation between side plates 76. Rolls 102 are located at the inner end of exit passage 22 with their bite in position for engaging original document 98 along a line lying in a plane substantially tangent to both tube 92 and guide roll 95. As the original document is advanced from between the bite of tube 92 and guide roll 95, its leading edge tends to move in the plane tangent to tube 92 and roll 95 and into the bite of outlet feed rolls 102. A pair of light-sealing elements 104 and 106, which extend downwardly from the bottom 44 of compartment 36 and from forward wall 30 of passage 22, respectively, to positions adjacent the bite of tube 92 and roll 95, assist in separating the original document from the photosensitive sheet and guiding the original into the bite of outlet rolls 102. It should be noted that although elements 103, 104 and 106 assist in guiding the original document through the apparatus, their major function is to prevent light from entering the apparatus through the inlet and exit passages and fogging or overexposing the photosensitive sheet.

After the photosensitive sheet has been exposed in conjunction with the original document and the original document has been separated from the exposed sheet and guided out of the apparatus, the photosensitive sheet is processed in conjunction with a second or image-receiving sheet 82 to form a copy of the original document on the second sheet. The means for processing the two sheets include a pair of pressure-applying rolls 108 and 110. Roll 108 is mounted for rotation on lower chassis 70. Roll 110 is mounted for rotation on a pair of pivotable arms 114, said arms being mounted on lower chassis 70 so as to provide for limited movement of roll 110 relative to roll 108. A spring mechanism 112 is provided biasing roll 110 toward roll 108.

The exposed portion of photosensitive sheet 78 is guided from between roll 95 and tube 92 to between the pressure-applying rolls 108 and 110. Image-receiving sheet 82 is conducted from spool 84 around roll 108 and into superposition with the photosensitive sheet between rolls 108 and 110. Since spools 80 and 84 are both mounted on lower chassis 70, the photosensitive and image-receiving sheets may be threaded in superposition between rolls 108 and 110 while housing sections 12 and 14 are in the open or inoperative position.

In the apparatus shown, the processing fluid is supplied in an elongated tubular container very much like a conventional drinking straw. This container, designated 124 in FIG. 5, includes a cavity of substantially uniform cross-section approximately equal in length to the width of the exposed photosensitive sheet and filled with the processing fluid. Both ends of the container are sealed with one end, designated 126, adapted to become unsealed and form a discharge mouth through which the processing fluid may be discharged in response to a hydraulic pressure generated within the enclosed fluid. The container is introduced into the apparatus through tapered opening 68 in lower side wall 62 until end 126 is located adjacent the margin of the photosensitive sheet furthest from opening 68, and the ends of the fluid-filled cavity are adjacent the lateral edges of the exposed area. Channel-shaped guide 128 (see FIG. 6), which is aligned with tapered opening 68 and extends from opening 68 to the near edge of the exposed area, assists in locating and guiding the fluid-filled container. After the container is fully inserted into the apparatus, the portion of the container adjacent the lateral edge of the exposed area of sheet 78 nearest opening 68 is compressed and the container then withdrawn from the apparatus. This withdrawal creates a hydraulic pressure in the enclosed fluid and causes the far end 126 of the container to become unsealed and the fluid contents to be ejected therefrom in the form of a uniformly distributed elongated mass extending across that portion of photosensitive sheet extending between guide roll 102 and the pressure-applying rolls 108 and 110.

The means for compressing the fluid-filled container, illustrated in FIG. 6, comprise lip 130 on guide 128 and a corresponding lip 134 on compression arm 132. Arm 132 is mounted for limited pivotal motion and is normally pivoted away from guide 128 so as to leave an open passage through which container 124 may be inserted into the apparatus. A button 200 mounted in a recess in upper wall 18 and upper side wall 50 is provided for pivoting compression arm 132 so that lip 134 is urged against lip 130 for applying compressive force to the container. Button 200 actuates shaft 138 and forces arm 140 to rotate in a clockwise direction. A spring 136 connects the portion of arm 140 most distant from shaft 138 and the end of arm 132 most distant from lip 134 so that lip 134 will bear against lip 130 and compress the fluid-filled container in response to depression of button 200.

After the processing fluid has been discharged onto photosensitive sheet 78, the photosensitive sheet is advanced into superposition with image-receiving sheet 82 and passed between pressure-applying rolls 108 and 110. The advancement of the two sheets between the pressure-applying rolls causes the mass of processing fluid to be distributed between the superposed sheets toward the trailing end of the exposed area of the photosensitive sheet.

The superposed sheets with the fluid between them are required to remain in darkness during a predetermined period, at the end of which they may be guided out of the housing and the sheets separated. A flywheel governor (not shown) is provided for insuring that the superposed sheets are not transported through the lighttight environment too rapidly for proper processing. The apparatus includes means for transporting the superposed sheets through the housing in a lighttight environment and guiding them from the housing through withdrawal opening 66. These means comprise a pair of withdrawal rolls 118 mounted in juxtaposition for rotation on lower chassis 70 within housing 10 and adjacent to opening 66. One of the rolls 118 is driven to advance the superposed sheets out of the apparatus at approximately the same speed with which the sheets are processed and advanced between pressure-applying rolls 108 and 110. In the illustrated apparatus, the relative speeds of rotation of the pressure-applying and withdrawal rolls are controlled by a drive chain (not shown) extending from the end of roll 108 nearest tapered opening 68 to the adjacent end of the upper of rolls 118.

A rotary knife 120 and anvil 122 are provided adjacent the pressure-applying rolls on the side thereof nearest withdrawal opening 66 for severing the exposed and processed superposed sheets from the unexposed and unprocessed sheet material. Knife 120 comprises an originally cylindrical rod mounted for limited rotation on lower chassis 70. The portion of knife 120 overlying the superposed sheets has been partially removed to give the remaining rod a substantially semicircular cross-section.

The superposed sheets, as shown in FIG. 4, pass between anvil 122 and the semicircular portion of knife 120 so that when the knife is rotated against the anvil the superposed sheets will be severed in a scissor-like cutting action. Anvil 122 is spring loaded to press against knife 120 for providing the positive shearing action necessary to obtain a clean cut.

A lever 400 is provided on lower side wall 62 for actuating knife 120. As illustrated in FIG. 6, a drive chain 121 extends from gear 119, mounted on shaft 117 coaxially with lever 400, to gear 123, mounted coaxially with knife 120, and insures that when lever 400 is depressed the knife will be rotated a sufficient number of degrees to sever the superposed sheets.

After the exposed and processed portions of sheets 78 and 82 have been severed from the unprocessed sheet material, the superposed sheets may be manually withdrawn from the housing through withdrawal opening 66. If the superposed sheets are then separated, the photosensitive sheet may be discarded; the image-receiving sheet comprises a copy of the original document. For a further explanation of photographic apparatus for making copies of original documents by a process involving the use of a heavy metal photosensitive salt, see copending U.S. application Serial No. 133,483, filed August 23, 1961.

To make a copy of an original document using the illustrated apparatus, an operator must first determine whether a direct or a reflex exposure will be required. A switch 500 is provided on upper side wall 52 for selectively determining which of the illumination sources will be illuminated and also for controlling the intensity of the actinic light that will be emitted from the selected source. Current for the illumination sources is supplied by a chemical cell (not shown) carried within housing 10. Although the source and light intensity may be selected prior to inserting the original document into the apparatus, a second switch, which will be described hereinafter, prevents the selected illumination source from being activated until the original is further advanced into superposition with photosensitive sheet 78.

When the original document 98 is manually inserted into inlet passage 20, it can be advanced only until its leading edge comes into contact with the juxtaposed inlet rolls 99. Means must therefore be provided for further advancing original document 98 until the leading edge of the original is adjacent photosensitive sheet 78 near the point where sheet 78 passes between tube 92 and guide roll 94. This means, illustrated in FIG. 6, includes lever 100 mounted on upper side wall 50, gear 144 mounted on shaft 142 coaxially with lever 100 and gears 146 mounted coaxially with inlet rolls 99, the latter being engaged with one another and one of gears 146 being engaged with gear 144. The number of degrees of rotation of lever 100 necessary to advance the original document the distance from the bite of inlet rolls 99 to the bite of tube 92 and roll 94 is determined by the relative diameters of gears 144 and 146. A pair of gears 148 similar to gears 146 and engaged with one another are mounted coaxially with exit rolls 102. One of gears 148 is engaged with gear 144 to insure that the inlet rolls 99 and exit rolls 102 rotate with the same peripheral speed.

A container of processing fluid must be removed from compartment 36 in upper housing section 12 and then inserted, beginning with sealed end 126, through tapered opening 68 in lower side wall 62 and into the apparatus. As previously noted, channel guide 128 assists in guiding and locating the fluid-filled container. A stop (not shown) limits the distance the container may be inserted and correctly locates the ends of the fluid-filled cavity relative to the exposed portion of photosensitive sheet 78. After the operator depresses button 200 and withdraws the container to deposit the processing fluid on the photosensitive sheet, he may discard the empty container.

Figure 7:
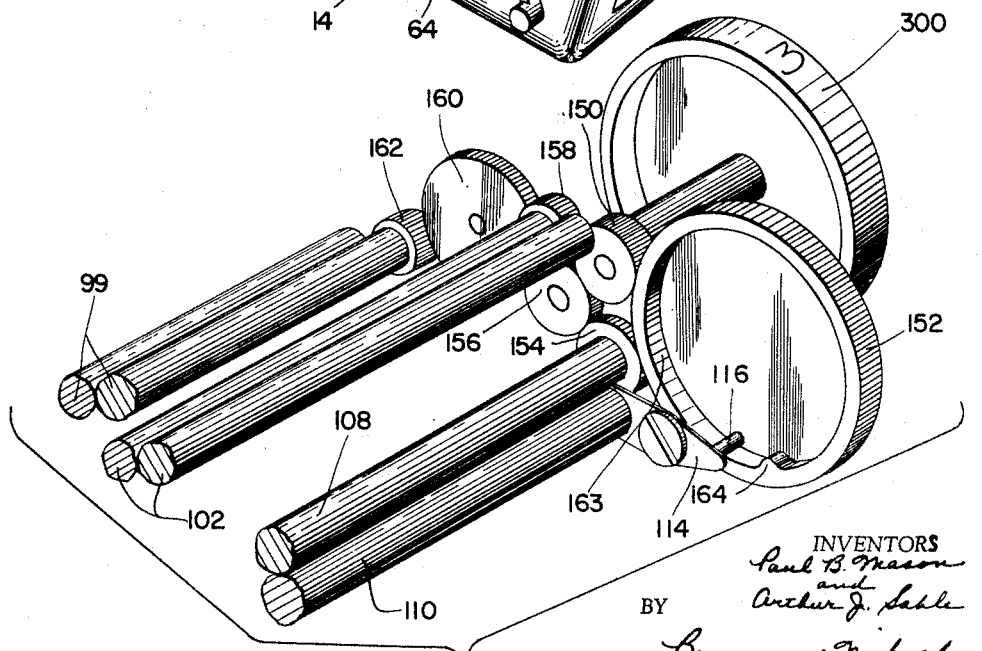

The operator now turns crank 300 on the right side of the apparatus to advance the photosensitive and image-receiving sheets through the apparatus. It is during this advancement that the original document is fed into superposition with photosensitive sheet 78 between the latter and tube 92, the photosensitive sheet is exposed, the original document is separated from the photosensitive sheet and fed out of the housing through exit passage 22, the photosensitive and image-receiving sheets are superposed, and the superposed sheets are advanced first between the pressure-applying rolls to distribute the processing fluid between the sheets and then out of the housing through withdrawal opening 66. The means for advancing the various sheets at the correct relative rates of speed comprise the sequence of engaged torque transmitting members illustrated in FIG. 7. Gear 150 mounted coaxially with crank 300 engages switch gear 152 which is in turn engaged with gear 154 mounted coaxially with pressure-applying roll 108. In the preferred form, gears 150, 152 and 154 are toothed gears to insure a positive drive between crank 300 and the pressure-applying rolls. Gear 150 also engages an idler gear 156 mounted for rotation on lower chassis 70 and transmits torque to exit rolls 102 through gear 158 mounted coaxially with one of exit rolls 102 on side plates 76 and engaging idler gear 156. Torque is transmitted from gear 158 to the inlet rolls 99 through idlear gear 160 on side plates 76 which engages both gear 158 and gear 162 which is mounted coaxially with one of inlet rolls 99. Gears 146 and 148 which are mounted on ends of inlet rolls 99 and exit rolls 102 opposite gears 158 and 162 help insure that both inlet and both exit rolls rotate at the same peripheral rate. A one-way clutch on shaft 142 between lever 100 and gear 144 allows the original document to be completely advanced through rolls 99 and 102 without forcing further rotation of lever 100.

Switch gear 152 is designed to make one complete revolution during each complete document-copying cycle. A cam-operated switch (not shown) on the side of gear 152 nearest crank 300 is designed to close the electrical circuit comprising the illumination sources as the original document 98 begins to enter into superposition with the photosensitive sheet, and to then open the circuit after the entire original document has been exposed in conjunction with the photosensitive sheet.

Switch gear 152 also comprises means for momentarily separating pressure-applying rolls 108 and 110 near the end of each operating cycle to permit any processing fluid remaining to the left (viewing FIG. 4) of rolls 108 and 110 to pass between the rolls rather than being retained and perhaps allowed to partially solidify in the area where the fresh fluid required to make the next copy will be deposited. As previously noted, roll 110 is mounted on pivotable arms 114 for limited movement relative to roll 108. Lug 116 on the end of arm 114 most distant from roll 110 extends outwardly from arm 114 and into contact with the inner race 163 of gear 152. Cam 164 on inner race 163 is designed to move lug 116 upward and thereby separate rolls 108 and 110 immediately after the entire exposed area of the photosensitive sheet has passed between the juxtaposed pressure-applying rolls in each document copying cycle. A similar means (not shown) is provided adjacent the end of the pressure-applying rolls most distant from crank 300 for assisting in the roll separation.

After cam 164 passes beyond lug 116 and the rolls are again juxtaposed, crank 300 should be stopped. If lever 400 is now rotated, the superposed sheets will be severed from the unprocessed and unexposed photosensitive and image-receiving sheet material. The completed photographic copy may now be manually removed from the apparatus.

In photographic processes of the type with which the illustrated apparatus is concerned, each step in the process must be correctly performed at the correct time in relation to every other step if good photographic copies are to be obtained. It is therefore desirable that the sequence of operational steps be positively controlled so that an operator cannot accidentally press the wrong button or lever at the wrong time and thereby ruin an otherwise good copy. In respect to those operations, such as the insertion of the original document and the insertion and withdrawal of the fluid-filled container, in which the operator also controls the method of performance, it is desirable that the means which control the sequence of operations also allow any of the operator's errors to be corrected without wasting any processing fluid or photosensitive or image-receiving sheet.

Reference is now made to FIGS. 8 through 12 wherein is shown the means for regulating the sequence of operations that must be performed to produce the photographic copy of an original document. While the operation of the regulatory mechanism will be hereinafter described by reference to FIGS. 9 through 12, the relation between the elements is most clearly shown in perspective in FIG. 8 where the components of the mechanism are shown as positioned after lever 100 has been rotated, button 200 has been depressed, and the container 124 has been withdrawn from the housing.

Figure 9:
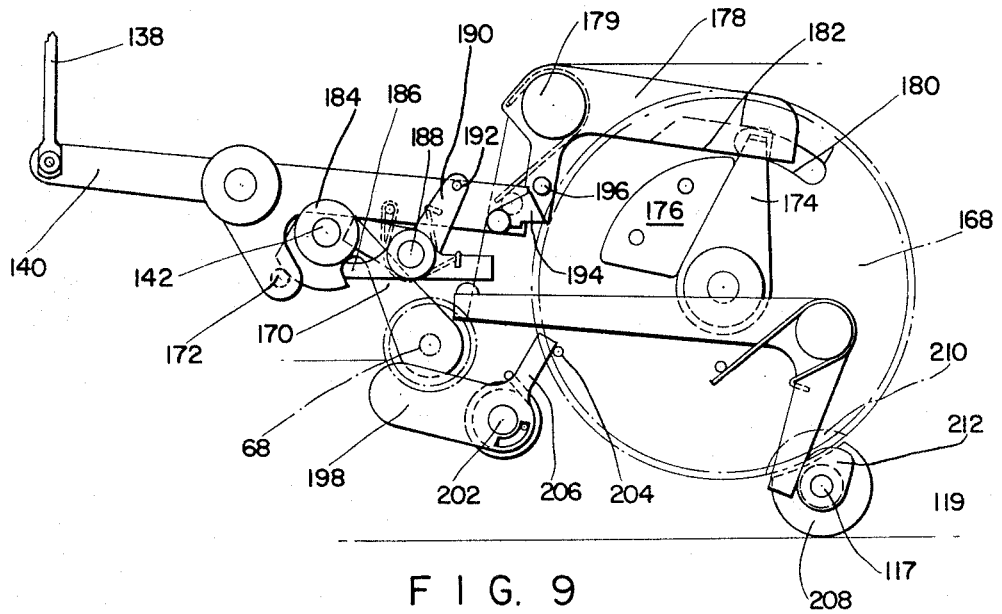
FIGS. 9 through 12 are diagrammatic views showing the location and interrelation of various components of the mechanism of FIG. 8 at various stages in the document copying process.

At the beginning of each operational sequence, before lever 100 has been rotated, the position of the various components of the regulatory mechanism is as shown in FIG. 9. Upper flag 170, which is mounted coaxially with lever 100 on shaft 142, covers tapered opening 68 and prevents a fluid-filled container from being introduced into the housing.

As previously noted, button 200 is connected to arm 140 through shaft 138 so that when the button is depressed arm 140 will be forced to rotate counterclockwise. As illustrated in FIG. 9, a pin 172 on the lower portion of arm 140 is in direct contact with a portion of flag 170. The contact between pin 172 and flag 170 is such that arm 140 is unable to rotate in the counterclockwise direction. Button 200 therefore cannot be depressed.

Since the drive connecting crank 300 and gear 168 is positive, crank 300 cannot be rotated if gear 168 is locked in position. The regulatory mechanism includes means for locking gear 168, and thereby preventing the superposed sheets from being advanced, until the original document has been completely inserted into the apparatus and the processing fluid has been discharged from container 124 onto the photosensitive sheet. This means is shown as comprising catch 174, catch arm 178 and stop 176. Catch 174 comprises an essentially L-shaped arm mounted coaxially with gear 168 for limited rotational movement relative to gear 168. The larger leg of catch 174 lies flush along the face of gear 168 and extends from the center of gear 168 to slot 180. The short leg of catch 174 extends into a slot 180 which is cut into a portion of the face of gear 168.

The rotation of catch 174 relative to gear 168 is limited by the interaction between the catch and the sides of slot 180. Stop 176, a simple metal block securely attached to the outer face of gear 168, is located so that its right edge will be flush against the left edge of catch 174 when the catch is rotated, relative to gear 168, counter-clockwise to the end of slot 180 adjacent stop 176. When, as illustrated in FIG. 9, stop 176 is in contact with catch 174, gear 168 is unable to rotate in a clockwise direction without the catch rotating simultaneously. Catch 174 is restrained from clockwise rotation by catch arm 178, an L-shaped metal arm having a thickness equal to approximately twice the thickness of catch 174 and lying with its inner face flush with the outer face of gear 168. A portion of the inner face of catch arm 178 is removed to provide a substantially rectangular cavity 182 containing the portion of catch 174 adjacent slot 180. The right edge of catch 174 and the right end of cavity 182 are in direct contact so that catch 174 is unable to rotate in a clockwise direction without catch arm 178 moving also. Catch arm 178 is mounted for limited pivotable motion about shaft 179 which is at a distance from catch 174. Since the rotation of catch 174 would require catch arm 178 to move linearly in a line tangential to slot 180, the catch and hence crank 300 are securely locked in their present positions.

Until crank 300 is rotated, the photosensitive and image-receptive sheets have not been advanced between the pressure-applying rolls and remain in the position they occupied when the previous copy made using the apparatus was severed and removed from the housing. For this reason, it is not necessary for lever 400, which operates cutter bar 120, to be locked or restrained at this time.

As previously noted, the first steps in making a copy of an original document are to manually insert the original document into inlet passage 20 and to then rotate lever 100 to further advance the original until it is adjacent the photosensitive sheet. Since lever 100 is spring biased toward its original position, means must be provided to lock lever 100 in the rotated position. As illustrated, the means comprises ratchet gear 184 mounted on shaft 142 coaxially with lever 100, and pawl 186 mounted for pivotable motion on shaft 188 and biased against ratchet gear 184. The ratchet gear and pawl are designed to permit only clockwise rotation of ratchet 184 and will retain lever 100 in its rotated position.

Figure 10:
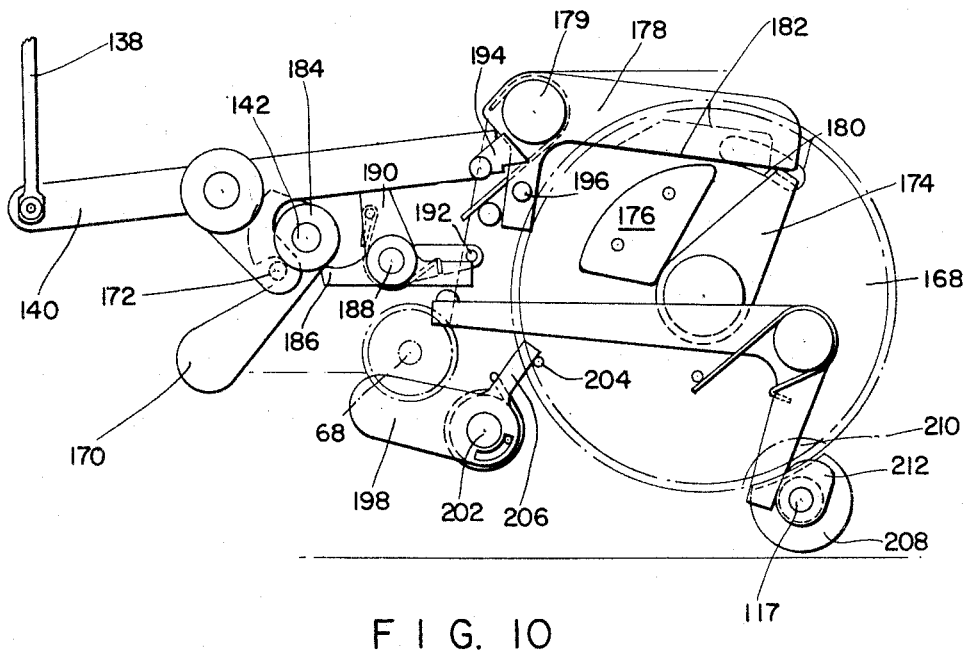
Figure 11:
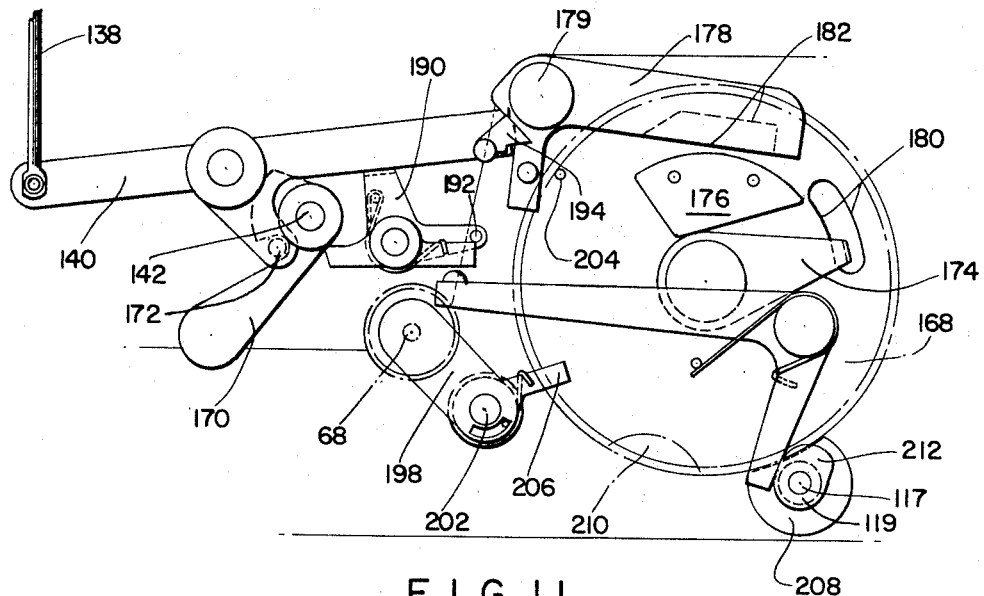

Since upper flag 170 is mounted coaxially with lever 100, rotating lever 100 to advance the original document will rotate flag 170 into the position shown in FIG. 10. The portion of flag 170 that had covered tapered opening 68 is no longer adjacent the opening and it is now possible to insert a fluid-filled container into the apparatus. The portion of the upper flag that had been in contact with pin 172 and had prevented arm 140 from rotation has also moved. Pin 172 is now adjacent a recess in flag 170 and it is possible to depress button 200 and thereby rotate arm 140 and compress the fluid-filled container which has been inserted into the apparatus.

Rotating lever 100 has no effect on catch 174 and catch arm 178 and crank 300 remains locked and inoperative.

Depressing button 200, in addition to compressing the fluid-filled container, serves to release catch 174 and allow crank 300 to be rotated and the photosensitive and image-receiving sheets and original document to be advanced through the apparatus. As arm 140 rotates counterclockwise in response to the depressing of button 200, a wedge-shaped toggle 194 on the end of arm 140 most distant from button 200 comes into contact with pin 196 on the lower portion of catch arm 178. As arm 140 continues to rotate, toggle 194 moves upward and forces pin 196 to move to the right, thereby forcing arm 178 to rotate counterclockwise and raising the portion of arm 178 containing the cavity 182. Since catch 174 is biased to rotate clockwise with respect to gear 168 it will rotate out from under catch arm 178 and into the position shown in FIG. 9 as soon as the catch arm is sufficiently raised so that no portion of catch 174 remains in contact with the end of cavity 182. After the toggle passes upward beyond pin 196, catch arm 178 will drop back into its original position. By this time, however, catch 174 has already moved from under arm 178 and thereby released gear 168. Crank 300 may then be rotated and the various sheets advanced through the apparatus.

The means for locking button 200 in the depressed position comprises an L-shaped arm 190 mounted on shaft 188 coaxially with pawl 186 and biased for clockwise rotation. A lug on the left end of arm 190 is in contact with the underside of the right portion of arm 140. As the right portion of arm 140 moves upward, arm 190 will rotate clockwise into the position shown in FIGS. 8 and 10 in which the lug acts as a seat for arm 140 and prevents the arm, and therefore also button 200, from rotating back into its original position. A pin 192 on the end of arm 190 most distant from arm 140 is in contact with the adjacent portion of pawl 186 and limits the maximum clockwise rotation of arm 190 to the position illustrated.

To prevent light from entering housing 10 through the opening and fogging or otherwise overexposing the photosensitive sheet, tapered opening 68 must be covered while photosensitive sheet 78 and image-receiving sheet 82 are advanced through the apparatus. The means for covering the opening during this period includes lower flag 198 shown as being generally oblong in shape and mounted for limited rotation on shaft 202 near the tapered opening. Flag 198 is spring-biased for clockwise rotation and designed so that, in the extreme clockwise position of its rotational arc, it covers opening 68. When gear 168 is in its original, locked position, flag 198 is rotated counterclockwise and away from over the tapered opening. It is held in this position, shown in FIG. 10, by the interaction of pin 204 on gear 168 and the underside of restraining tab 206, a small rectangular projection on the portion of flag 198 adjacent shaft 202. When crank 300 is rotated to advance the photosensitive and image-receiving sheets, gear 168 will rotate clockwise and pin 204 will initially move upward, first forcing flag 198 to rotate slightly in a counterclockwise direction and then, as it moves past restraining tab 206, releasing the tab thereby allowing flag 198 to move into the position shown in FIG. 11 in which it covers tapered opening 68 and prevents both light and a second fluid-filled container from entering the housing.

Lever 400 should be locked during the processing and advancement of the photosensitive and image-receiving sheets so that the superposed sheets cannot accidentally be severed and an otherwise good photographic copy of the original document destroyed. A cam 208, mounted on shaft 117 coaxially with lever 400, insures that the lever cannot be rotated when gear 168 is in any but its original position. Since gear 168 is designed to make one complete revolution during each document-copying operation, lever 400 can be rotated only before crank 300 has been rotated and after the exposed area of the photosensitive sheet has been completely processed and advanced beyond knife 120. As illustrated, cam 208 comprises a substantially circular disc having the portion of the disc closest to gear 168 removed so as to provide limited clearance between cam 208 and the periphery of gear 168 when the gear is rotated out of the locked position. When gear 168 is in the locked position, cam 208 is located adjacent a semicircular recess 210 in the face and periphery of gear 168. Recess 210 has a radius and depth slightly greater than the radius and depth of cam 208 and is designed to allow cam 208 to rotate into the recess when the cam and recess are adjacent one another. When the cam and recess are not adjacent, cam 208 faces a solid portion of the periphery of gear 168 and lever 400 is unable to rotate.

Figure 12:
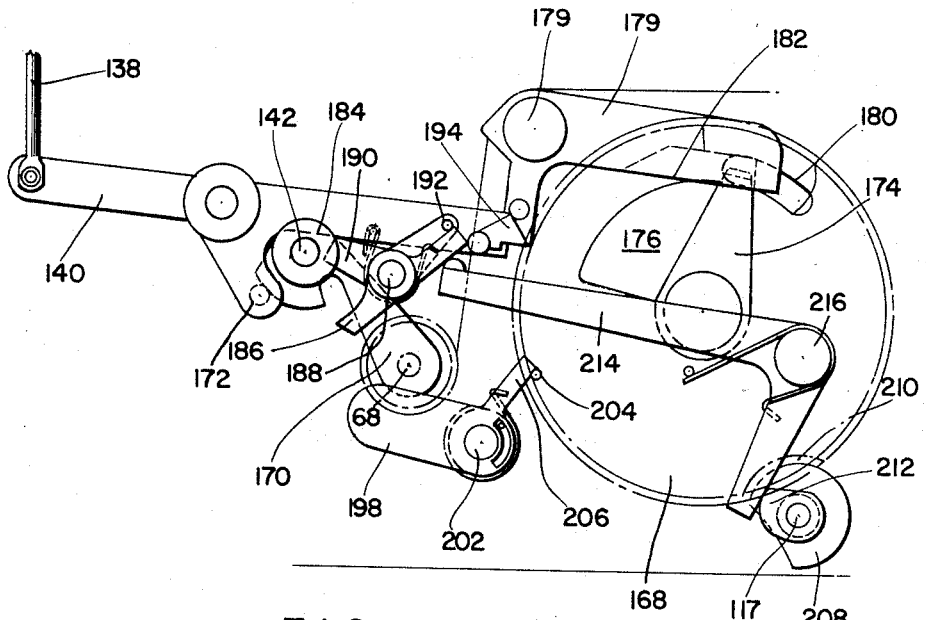

As gear 168 completes each revolution, catch 174 moves, from left to right in FIG. 12, into cavity 182 in catch arm 178. Catch 174 continues to rotate until the right edge of the catch comes into contact with the right end of cavity 182. As gear 168 continues its rotation catch 174, restrained by cavity 182, rotates counterclockwise relative to gear 168 until the left edge of the catch is pulled up flush against the right side of stop 176. When catch 174 comes in contact with the stop, gear 168 and crank 300 are again locked in their original position.

At the same time catch 174 is being introduced into cavity 182, pin 204 on gear 168 comes into contact with the lower edge of restraining tab 206 on lower flag 198. As the catch rotates to the right end of cavity 182 and gear 168 then rotates the few remaining degrees into the locked position, pin 204 moves upward against the restraining tab and forces lower flag 198 to rotate counterclockwise away from over tapered opening 68 into the position shown in FIG. 12. By this time, the entire exposed area of photosensitive sheet 78 has passed between the pressure-applying rolls, and it is no longer necessary to prevent light from entering the apparatus through the tapered opening.

In addition to actuating knife 120, lever 400 also serves to release lever 100 and button 200 allowing them to return to their original positions. The release means comprises a second cam 212 mounted on shaft 117 coaxially with lever 400 and an L-shaped release arm 214 mounted for pivotable motion about shaft 216 on the inside of lower side wall 62. When lever 400 is rotated and shaft 117 and cam 212 are rotated counterclockwise, cam 212 comes in contact with the lower leg of arm 214 and forces the arm to pivot clockwise into the position shown in FIG. 12. The left end of arm 214 comes into contact with the end of pawl 186 most distant from rotated gear 184 and forces pawl 186 to rotate counterclockwise away from gear 184 thereby releasing ratchet gear and allowing upper flag 170 and lever 100 to rotate back into their original positions in which flag 170 covers tapered opening 68.

Pin 192 on arm 190 rests on the upper portion of the end of pawl 186 adjacent arm 214 and any counterclockwise rotation of the pawl will force coaxially mounted arm 190 to rotate an equal number of degrees in the same direction. The forced rotation of arm 190 in response to the actuation of lever 400 moves the lug on arm 190 that had provided a seat for arm 140 out from under the latter and thereby allows button 200, which is connected to arm 140 through shaft 138, arm 140, and the means for compressing the fluid-filled container to return to their original positions.

If lever 400 is now released, cam 212 will rotate clockwise, allowing arm 214 to drop back into its original position and pawl 186 to rotate back against ratchet gear 184. The entire regulatory mechanism is now back in the original position illustrated in FIG. 9. The severed superposed sheets may be manually removed from, and the next document to be copied inserted into, the apparatus.

It is important to note that it is possible to rotate lever 400 and thereby release lever 100, button 200, inlet roll 99 and the means for compressing the fluid-filled container at any time before crank 300 has been rotated. If the wrong document is inadvertently inserted into the apparatus it may easily be removed and replaced. Rotating lever 400 will release ratchet 184 and inlet rolls 99 and eject the original document, whose location within the apparatus has been determined by the amount of rotation of the inlet rolls, out of inlet passage 20. The processing fluid never comes in contact with the original document so the documents may be released and replaced even if the error is not discovered until after the processing fluid has been dispensed from its container and deposited on the photosensitive sheet.

Since rotating lever 400 also releases compression arm 132 and allows lip 134 on arm 132 to move away from the lip 130 on guide 128, an operator may easily withdraw a fluid-filled container from the apparatus without discharging the fluid from the container even if button 200 has already been pressed to compress the fluid-filled container. Similarly, if button 200 is inadvertently depressed before the fluid-filled container is inserted into the apparatus, lever 400 may be depressed to release the compression arm and allow the omission to be corrected.

While the present invention has been described with reference to a crank-operated machine, it should be understood that the illustrated regulatory mechanisms could be incorporated, with few or no modifications, in any other type of hand-operated device or in any device in which the operating crank is replaced by a mechanical or electric motor. In a device, for example, in which the superposed sheets are manually drawn through the apparatus and the pressure-applying rolls are driven by the frictional contact between the rolls and the superposed sheets, the crank 300 may be deleted. The frictional force between the rolls and sheets is sufficient to prevent the sheets from being advanced when the rolls are locked and the regulatory mechanism, which locked the pressure-applying rolls and crank 300 simultaneously, in the illustrated device, may be incorporated substantially as described.

In a device where the crank is replaced by a motor, the major change required in the regulatory mechanism is the replacement of catch 174 and catch arm 178 with a switch for starting and stopping the motor at the correct time.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic document copying apparatus including advancement means for feeding original documents into said apparatus into superposition with successive areas of an image-recording sheet, a housing formed with an opening through which a container of processing liquid can be introduced into said apparatus, pressure means movable into engagement with said container to dispense said liquid contents during withdrawal of said container from said apparatus through said opening, manually driven actuating means for moving said image-recording sheet through said apparatus to expose said areas of said image-recording sheet in superposition with said originals, distributing said processing liquid in contact with said exposed areas and advancing successive portions of said sheet, each including one of said areas, from said apparatus, and cutting means for severing each of said portions from the remainder of said sheet within said apparatus, in combination, interlock means for insuring that all of the operations required to be performed on and by said apparatus to produce a copy of an original are performed and in proper sequence, said interlock means comprising, in combination:

first control means coupled with said actuating means and including arresting means for permitting operation of said actuating means through a predetermined operating cycle and then arresting the operation of said actuating means at the end of said operating cycle;

first manually operable drive means for moving said pressure means into engagement with said container;

closure means including a closure member movable between a closed position across said opening at which introduction of a container through said opening is precluded and an open position to one side of said opening;

second manually operable drive means for actuating said advancement means to feed the leading end of said original into said apparatus and move said closure member into said open position;

second control means coupled with said first and second drive means for releasably restraining said first and second drive means against operation; and coupling means actuated by operation of said cutting means for coacting with said second control means to cause the latter to release said second drive means for operation;

said second control means including means responsive to operation of said second drive means for releasing said first drive means for operation, and means coupled with said first control means and responsive to operation of said first drive means for causing said first control means to permit the operation of said actuating means through an operating cycle.

2. The photographic apparatus of claim 1 in which said first control means include a second closure member and means for moving said second closure member into a closed position across said opening to prevent introduction of a container through said opening during operation of said actuating means.

3. The photographic apparatus of claim 1 in which said closure means include resilient means for urging said closure member into closed position, said second control means include means for holding said closure means in said open position and said first control means include means for releasing said closure member for movement into said closed position.

4. The photographic apparatus of claim 1 in which said first and second drive means each include components movable manually from initial to terminal positions to operate said first and second drive means, and resilient means for returning said components from said terminal to said initial positions; said second control means include locking means for retaining said components in said terminal positions; and said coupling means coact with said locking means to release said components for return movement into said initial positions.

5. The photographic apparatus of claim 1 in which said advancement means include a pair of juxtaposed rolls for engaging said original therebetween, coupled with said second drive means for rotation thereby through an overrunning clutch and coupled with said actuating means for rotation thereby through a second overrunning clutch.

6. In photographic document copying apparatus including means for exposing successive areas of a photosensitive sheet through a movement of said sheet through said apparatus, means for dispensing a processing liquid from successive tubular containers for distribution in contact with said exposed areas, and means for distributing said liquid in contact with said exposed areas during movement of said sheet, in combination:

first actuating means for advancing an original document into said apparatus into position to be copied;
guide means for locating successive tubular containers, introduced into said apparatus, in position for dispensing their liquid contents for distribution in contact with said photosensitive sheet;
closure means associated with said guide means and normally disposed in closed position for preventing introduction of one of said containers into said apparatus and movable into an open position at which introduction of one of said containers is possible;
said first actuating means including means for moving said closure means into said open position during advancement of an original into position to be copied; and
manually operable means for moving said closure means into said closed position following exposure and processing of each of said areas of said photosensitive sheet.

7. The photographic apparatus of claim 6 including second closure means associated with said guide means, normally disposed in an open position allowing introduction of one of said containers into said apparatus and movable into a closed position for preventing introduction of one of said containers into said apparatus; and drive means movable through an operating cycle for moving said sheet through said apparatus to effect the exposure and processing thereof, said drive means including means coupled with said second closure means for moving said second closure means into said closed position thereof at the start of said operating cycle and returning said second closure means to said open position thereof at the end of said operating cycle.

References Cited by the Examiner

UNITED STATES PATENTS

| 2,979,026 | 4/61 | Reuter | 95—1.7 X |
| 3,019,714 | 2/62 | Teiser et al. | 95—1.7 |
| 3,044,386 | 7/62 | Limberger | 95—1.7 X |
| 3,103,865 | 9/63 | Mason et al. | 95—75 |

EVON C. BLUNK, *Primary Examiner.*